UNITED STATES PATENT OFFICE.

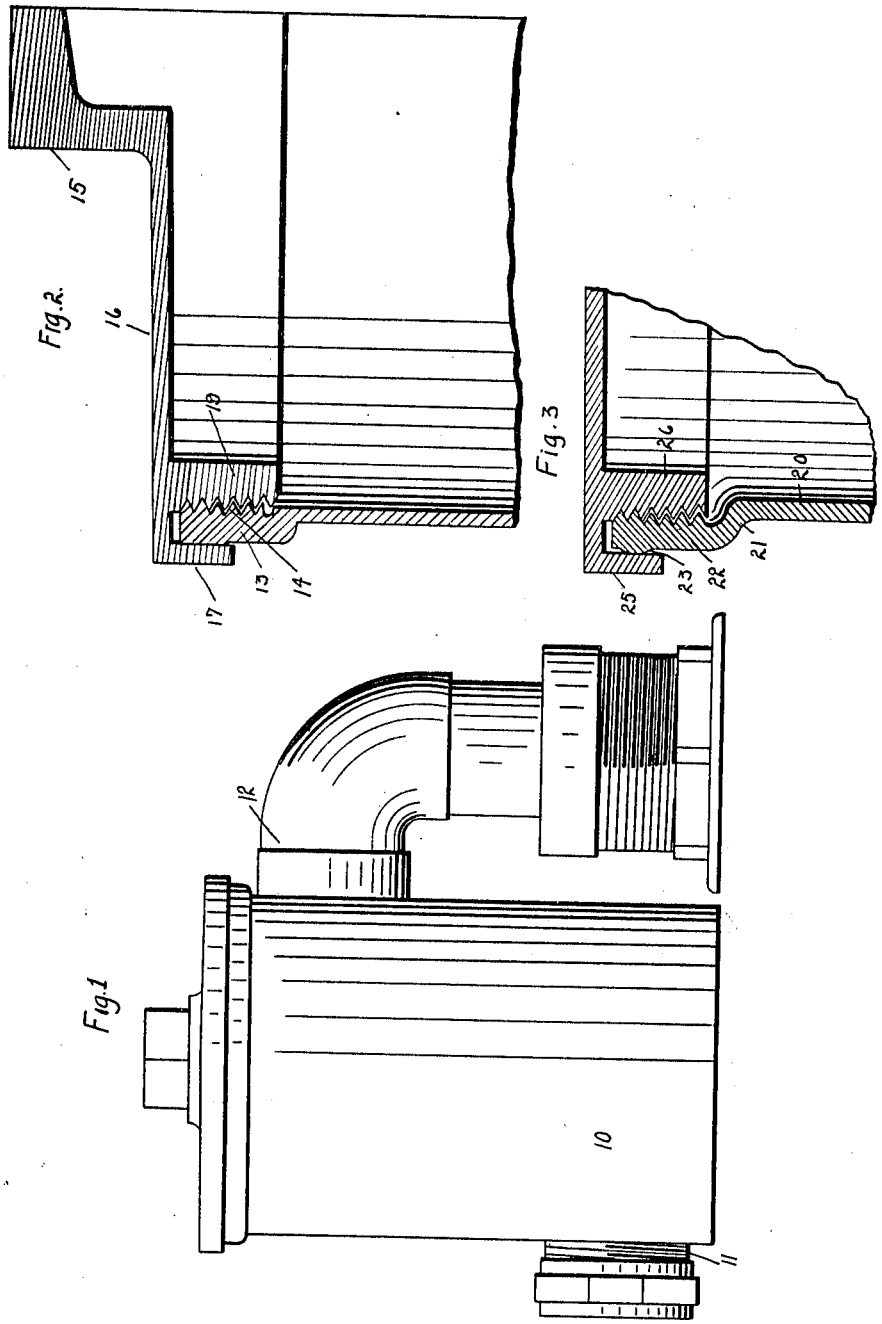

JOHN H. NICHOLS, OF SPENCER, IOWA, ASSIGNOR TO LEON K. MAULSBY, OF SPENCER, IOWA.

TIGHT-JOINT COVER.

1,316,969.  Specification of Letters Patent.  Patented Sept. 23, 1919.

Application filed November 30, 1917. Serial No. 204,789.

*To all whom it may concern:*

Be it known that I, JOHN H. NICHOLS, a citizen of the United States, and resident of Spencer, in the county of Clay and State of Iowa, have invented a certain new and useful Tight-Joint Cover, of which the following is a specification.

The object of my invention is to provide a tight joint cover for traps of bath tubs, clean-out pipes, waste line pipes and the like, which does not require packing.

More particularly it is my object to provide a tight joint cover whereby a metal to metal tight joint can be secured, thereby doing away with the use of rubber or other non-metallic gaskets.

A further object is to provide such a tight joint cover comprising a cylindrical wall having in its upper end interior screw-threaded portions, in connection with a cover having an external flange, and a downwardly extending inwardly spaced internally screw-threaded flange, the upper surface of which is beveled on an angle slightly different from that of the inner surface of the screw-threaded portion of the wall, so that when the cover is screwed in to the wall, the upper edge of the wall will be firmly gripped between the two flanges.

With these and other objects in view my invention consists in the construction, arrangement and combination of the various parts of the device, whereby the objects contemplated are attained, as hereinafter more fully set forth, pointed out in my claims and illustrated in the accompanying drawings, in which:

Figure 1 shows a side elevation of a trap equipped with a tight joint cover embodying my invention.

Fig. 2 shows a vertical, central, sectional view through one side of the same; and Fig. 3 shows a vertical, sectional view through one side of a slightly modified form of my invention.

In the accompanying drawings, I have used the reference numeral 10 to indicate generally the body of a trap having a cylindrical wall through which extends an inlet pipe 11 and an outlet pipe 12.

At the upper end of the wall of the trap 10 is a thickened annular wall portion 13, provided with internal screw-threads 14.

In practice when I use my device as a trap, I make the trap portion 10 of brass pressed in a single piece and sweat the portion 13 on after the receptacle has been made.

My improved cover 15 comprises a disk-shaped portion 16 having at its periphery a downwardly extending flange 17 adapted to receive the portion 13 at the top of the wall 10.

Spaced inwardly from the flange 17 is an annular, downwardly extending flange 19 having external screw-threads. The outer surface of the flange 19 is slightly beveled from top to bottom so as to permit the cover to be started by hand easily. It will be seen, however, that as the cover is screwed downwardly, the upper part of the flange 19 tends to press my tight joint cover against the portion 13 and the upper edge of the portion 13 is thereby firmly gripped between the flanges 17.

With the ordinary plug cover of the type that screws inside a cylindrical wall, there is always the danger that the beveled edge of the wall will be finally stretched until the plug cover will not fit tight. With a device of the class herein shown, such spreading or stretching of the upper part of the wall is impossible.

In Fig. 3 I have shown a slightly modified form of my invention showing the cylindrical wall 20 at the upper end of which is an outwardly extending annular flange 21 having an upwardly extending annular wall portion 22. It will thus be seen that at the upper end of the portion 20 is formed an angle-iron shaped portion adapted to give greater strength to the upper end of the wall 20. The portion 22 is provided just below its upper edge on its outside with a bead 23. The inner surface of the portion 22 is screw-threaded, and a cover 24 similar to the cover 15 is provided, having the outer flange 25 and the inner externally screw-threaded flange 26 similar to the flange 19.

In the form shown in Fig. 3, the portion 21 gives the structure greater strength and the use of the bead or the like 20 makes it possible to start the cover without any difficulty, and very little friction occurs until the cover has been screwed on a considerable distance.

It will be noted that I have provided a cover by which a tight joint can be secured between the metal faces, and without the use of rubber or leather or composition gaskets.

The advantage of such a joint is well-known to plumbers and experts in similar lines.

Rubber and leather gaskets wear rapidly, especially where it is necessary to frequently remove the cover members.

Furthermore it is difficult to insure that a rubber or leather or composition gasket will set properly in position when placed between two members which have a screw-threaded connection. Such gaskets often stick, or cut or peel or double up while the cover is being put on or removed.

By using the beveled flanges, I find that I can start the cover easily, without crossing threads. In fact my form of cover makes it practically impossible to start the cover with crossed threads.

Some changes may be made in the construction and arrangement of the various parts of my improved tight joint cover, without departing from the essential features and purposes thereof, and it is my intention to cover by my present claims any modified forms of structure or use of mechanical equivalents which may be included within the scope of my claims.

I claim as my invention:

1. In a device of the class described, a cylindrical wall having at its upper end an internally screw-threaded portion, a cover member having an external annular flange adapted to receive said portion, and having an inwardly spaced, externally screw-threaded flange, the outer surface of said latter flange being slightly beveled for causing the upper edge of said wall to be tightly gripped between said flange when the cover is screwed down on said wall and for permitting the threads to be readily started.

2. In a device of the class described, a cylindrical wall having at its upper end an internally screw-threaded portion, a cover member having an external annular flange adapted to receive said portion, and having an inwardly spaced, externally screw-threaded flange, the outer surface of said latter flange being slightly beveled for causing the upper edge of said wall to be tightly gripped between said flange when the cover is screwed down on said wall and for permitting the threads to be readily started, said wall having at the lower edge of said upper portion thereof an outwardly curved portion, whereby there is formed an annular reinforcement.

3. In a device of the class described, a cylindrical wall having at its upper end an internally screw-threaded portion, a cover member having an external annular flange adapted to receive said portion, and having an inwardly, spaced, externally screw-threaded flange, the outer surface of said latter flange being slightly beveled for causing the upper edge of said wall to be tightly gripped between said flange when the cover is screwed on said wall and for permitting the threads to be readily started, the upper portion of said wall having below its upper edge an annular bead.

4. In a device of the class described, a cylindrical wall having at its upper end an internally screw-threaded portion, a cover member having an external annular flange adapted to receive said portion, and having an inwardly spaced, externally screw-threaded flange, the outer surface of said latter flange being slightly beveled for causing the upper edge of said wall to be tightly gripped between said flange when the cover is screwed down on said wall and for permitting the threads to be readily started, said wall having at the lower edge of said upper portion thereof an outwardly curved portion whereby there is formed an annular reinforcement, the upper portion of said wall having below its upper edge an annular bead.

5. In a device of the class described, a tubular member having at one end an internally screw-threaded portion, and a second member having a pair of annular spaced concentric flanges designed to receive therebetween the end of the tubular member to thereby form a tight joint, the inner flange having its outer surface beveled away from the outer flange and screw-threaded to coact with the threads of the tubular member, whereby the threads may be readily started to screw the second member onto the first and the latter part of the threads cause the end of the tubular member to be closely gripped between the two flanges.

Des Moines, Iowa, November 15, 1917.

JOHN H. NICHOLS.

Copies of this patent may be obtained for five cents each, by addressing the "Commissioner of Patents, Washington, D. C."